(12) United States Patent
Hsu

(10) Patent No.: US 6,345,043 B1
(45) Date of Patent: Feb. 5, 2002

(54) ACCESS SCHEME FOR A WIRELESS LAN STATION TO CONNECT AN ACCESS POINT

(75) Inventor: Yi-Shou Hsu, Hsinchu (TW)

(73) Assignee: National Datacomm Corporation, Hsinchu (TW)

( * ) Notice: Subject to any disclaimer, the term of this patent is extended or adjusted under 35 U.S.C. 154(b) by 0 days.

(21) Appl. No.: 09/110,829

(22) Filed: Jul. 6, 1998

(51) Int. Cl.[7] .............................. H04B 7/212; H04J 3/06; H04Q 7/20

(52) U.S. Cl. .................. 370/324; 370/350; 370/509; 455/161.1; 455/403; 455/435

(58) Field of Search ................................. 370/310, 324, 370/328, 347, 350, 498, 503, 509, 512–514; 455/403, 435, 161.1

(56) References Cited

U.S. PATENT DOCUMENTS 5,844,900 A * 12/1998 Hong et al. ................. 370/342
6,088,591 A * 7/2000 Trompower et al. ........ 370/331
6,256,334 B1 * 7/2001 Adachi ....................... 370/310
6,259,898 B1 * 7/2001 Lewis ......................... 370/338

* cited by examiner

Primary Examiner—Wellington Chin
Assistant Examiner—Maikhanh Tran

(57) ABSTRACT

An access scheme for a wireless LAN station to connect an access point on the network. This scheme allows a wireless station to finish all the processes from search to registration with an AP at a very high speed. Firstly, the time interval of beacon transmission is shortened when a wireless station is powered on. Secondly, the authentication phase in traditional registration with an AP is eliminated. Instead, a period of time on each channel is reserved. Accordingly, the wireless LAN station can use this period to exchange control frames with the AP without competing with other stations to access wireless medium. This results in quick access to the network.

2 Claims, 6 Drawing Sheets

ACCESS SCHEME FOR A WIRELESS LAN STATION TO CONNECT AN ACCESS POINT

FIELD OF THE INVENTION

The present invention relates generally to wireless local area network (LAN) systems, and more particularly to an access scheme for a wireless LAN station to connect an access point (AP).

BACKGROUND OF THE INVENTION

According to the wireless LAN standard (IEEE 802.11), a wireless LAN station needs to connect to an AP for accessing a file server or other workstations of a network system. The AP connects distributed systems and a set of basic service areas. It provides the communication between a local station in a wireless LAN and a remote station in another LAN. It also provides the capability of accessing distributed system for a station.

FIG. 1 shows the typical hardware architecture of a wireless LAN system. As illustrated in FIG. 1, an Ethernet LAN 100 may have two basic service sets 101 ($BSS_1$) and 102 ($BSS_2$), one workstation 103 and one file server 104. Each basic service set comprises one access point and two wireless stations. Basic service set $BSS_1$ includes the access point $AP_1$ and two stations $STA_1$ and $STA_2$. Basic service set $BSS_2$ includes the access point $AP_2$ and two stations $STA_3$ and $STA_4$. Each wireless station should associate itself with one AP before it can communicate with the file server 104 or the workstation 103 in the Ethernet LAN 100.

When a wireless LAN station is powered on, it first looks for an AP. After it finds an AP, the wireless LAN station register itself with the AP. The station can then synchronize with the AP and, thereafter, transmit and receive information packet to and from the AP.

According to the wireless LAN standard (IEEE 802.11), the bandwidth used in the RF (radio frequency) is between 2.40 GHz and 2.50 GHz among 79 channels in the US and Canada areas. The frequency hopping radio signal shall hop in the frequency band between 2.40 GHz and 2.50 GHz as shown in FIG. 2. The AP shall be the timing master and shall perform the TSF (timing synchronization function) to keep the timers for all wireless stations in the same BSS synchronized. For each channel, the AP shall periodically transmit special frames called beacons each containing a copy of its TSF timer and hopping sequence to synchronize other wireless stations in a BSS. The AP shall broadcast a generated beacon frame at a fixed time interval referred to as a beacon interval.

A receiving wireless STA shall always accept the timing information in beacons sent from the AP servicing its BSS. If a wireless STA's TSF timer is different from the timestamp in the received beacon frame, the receiving wireless STA shall set the value of its local timer to the received timestamp value.

Traditionally, when an AP is powered on in a basic service set, it periodically broadcasts a beacon frame to all wireless STAs in the service set. The beacon frame contains the information for synchronizing with the AP and the information is referred to by the wireless STA looking for the AP. Because the beacon interval used in the traditional approach is long (100 mini seconds), it could increase the search time for an AP to the wireless STA looking for the AP.

A wireless LAN station needs to do a registration before it can communicate with an AP. According to 802.11 standard, the registration should include two phases. The first phase is authentication. This process is used to identify whether the station has the legal right or not to access the wireless network via a medium access control (MAC) layer. After the authentication is passed, the station needs to establish a connection link with the AP by sending an association request packet to the AP and waiting to receive a response frame from the AP which acknowledges the association.

The general steps taken for a wireless STA by a traditional MAC sub-layer management architecture from search to registration with an AP are shown in FIG. 3. According to the design of FIG. 3, a wireless STA shall perform the three phases: scanning phase, authentication phase and association phase.

In the scanning phase, all IEEE 802.11 STAs initially start "IDLE" state (step 301). The radio hopping channel shall be set by the hardware (step 302). To search for the AP, a wireless STA shall listen in each channel and scan for any beacon frame transmitted by the AP (step 303). Upon finding the channel and receiving the AP beacon, the scanning phase is completed. Otherwise, the wireless STA shall listen in the next channel and return to step 302. A new radio hopping channel shall be set.

After receiving the AP beacon, the receiving wireless STA will join a BSS by setting its local hopping time and channel sequence according to the information contained in the AP beacon (step 304) in order to maintain synchronization with the AP. The remaining steps constitute the authentication phase and association phase.

In the authentication phase, IEEE 802.11 in general requires bi-directional authentication. At step 305, the wireless STA exchanges some packets with the AP for authentication. It may further include three steps of assertion of identity, challenge of assertion and response to challenge.

In the association phase (step 306), the wireless STA exchanges the association packets with the AP to accomplish the AP registration. The communication link between the wireless STA and the AP is thus setup. The wireless STA can start exchanging data frames with the AP (step 307).

Because the radio frequency hops between 2.40 GHz and 2.50 GHz, a wireless LAN station may take a long time to find an AP among the 79 channels in Federal Communications Commissions (FCC) regulation.

Each frame used in authentication and association should be sent in complying with the rule of to 802.11 standard (Carrier Sense Multiple Access with Collision Avoidance, CSMA/CA). The time consumed for a wireless station to complete all the processes of authentication and association may vary greatly, and is unpredictable, especially when the traffic in the wireless medium is busy. Therefore, the total time from searching for an AP to accomplish the registration is unpredictable for the wireless LAN stations that comply with 802.11 standard.

From the foregoing discussions of prior arts, it can be seen that the disadvantages as pointed out earlier make the conventional access scheme inappropriate for a wireless LAN station to connect with an AP. There exists a strong need for having a more efficient access scheme for the wireless LAN station to quickly access a wireless LAN through an AP.

SUMMARY OF THE INVENTION

This invention has been made to overcome the above mentioned drawbacks and inefficiencies in a wireless LAN. The primary object of the present invention is to provide a new scheme that allows a wireless LAN station to finish all the processes from search to registration with an AP at a very high speed.

In accomplishing that object, the present invention changes the method of searching for an AP when a wireless LAN station is powered on. The time interval of beacon transmission is reduced from 100 mini seconds to 10 mini seconds. Thus, the time used in searching for an AP is shortened because the wireless LAN station only needs to stay in a channel for 10 mini seconds to search for the beacon frame on each hopping channel. For FCC regulation, this change reduces the search time from 7900 (79*100) mini seconds to 790 (79*10) mini seconds.

Another object of the invention is to solve the problem that the time consumed for a wireless station to complete all the processes of authentication and association may vary a lot and the required time is unpredictable. Because upper layer applications do the authentication as well as check a station which logins in to the server, the present invention omits the authentication process first. It is expected that the network security shall not be affected much due to the elimination of the authentication process in wireless LAN MAC layer.

In addition, the present invention reserves a period of time dedicated to sending the association control packets on each channel. The data packet cannot be sent in this period for an AP and other associated stations. Therefore, when the station is just turned on and trying to associate with an AP, it can use this reserved period to exchange the control frames with the AP without having to compete with other stations to access the wireless medium.

Briefly, this invention discloses a scheme to shorten the time in searching for an AP for a wireless LAN station by reducing the time interval of the beacon transmission. Accordingly, it reduces the search time by a ratio 1/10.

In addition, when a wireless LAN station needs to do a registration before it can communicate with an AP, the invention eliminates the authentication process, and reserves a period of time on each channel for sending the association control packets. Accordingly, it allows a wireless LAN station to finish all the processes from search to registration with an AP at a very high speed.

The foregoing and other objects, features, aspects and advantages of the present invention will become more apparent from a careful reading of a detailed description provided herein below, with appropriate reference to the accompanying drawings.

BRIEF DESCRIPTION OF THE DRAWINGS

FIG. 4 shows a flow diagram illustrating the general steps taken by a wireless STA from search to registration with an AP according to the invention when a wireless LAN station is powered on.

DETAILED DESCRIPTION OF THE PREFERRED EMBODIMENTS

Figure 1:
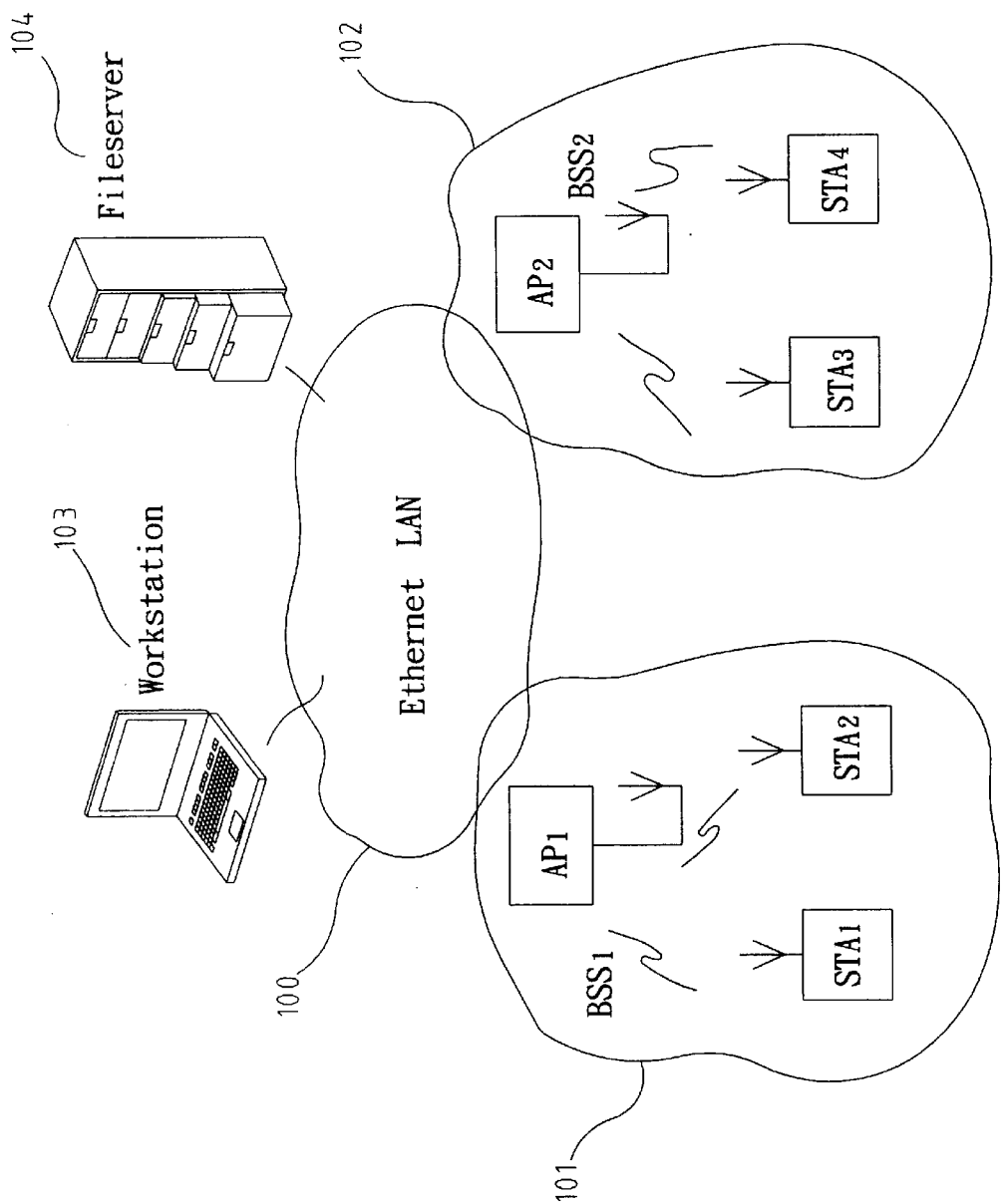
FIG. 1 illustrates the typical hardware architecture for a wireless LAN system.
Figure 2:
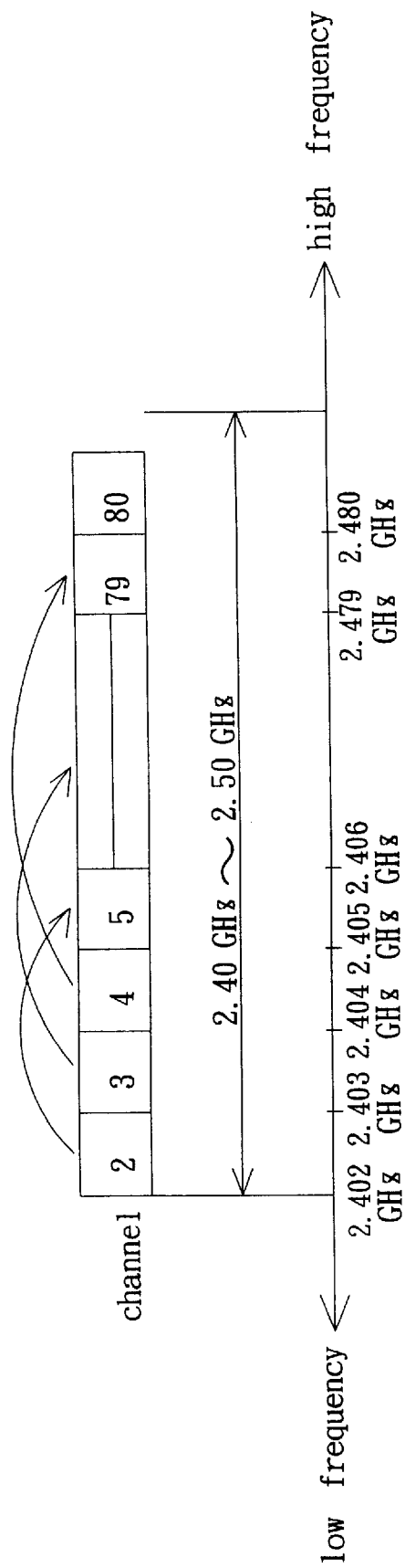
FIG. 2 illustrates that the radio signal shall hop among 79 channels within the frequency band between 2.40 GHz~2.50 GHz in the U.S. and Canada areas according to IEEE 802.11 standards.
Figure 3:
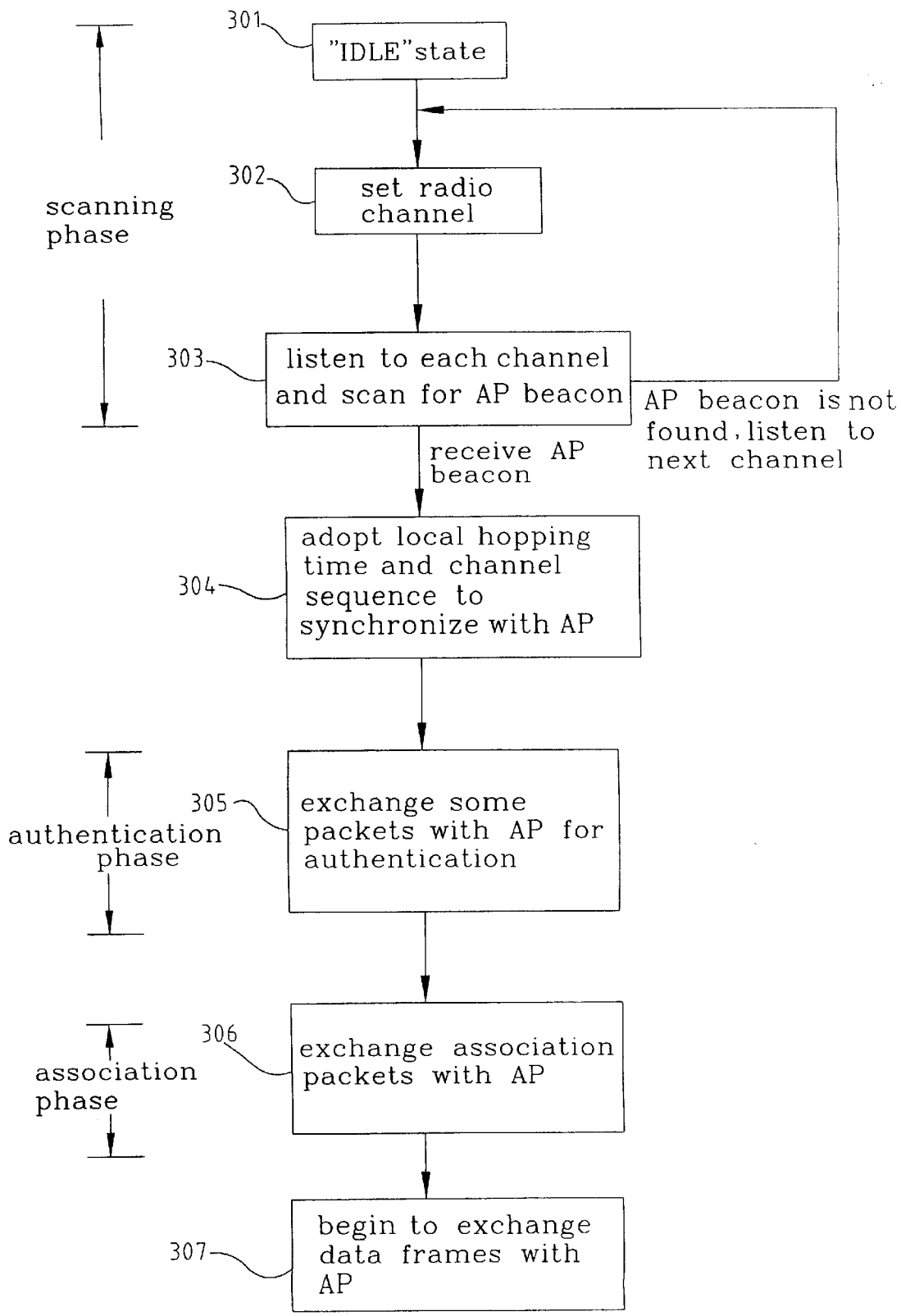
FIG. 3 illustrates the general steps taken by a traditional MAC sub-layer management architecture for a wireless STA from search to registration with an AP.
Figure 4:
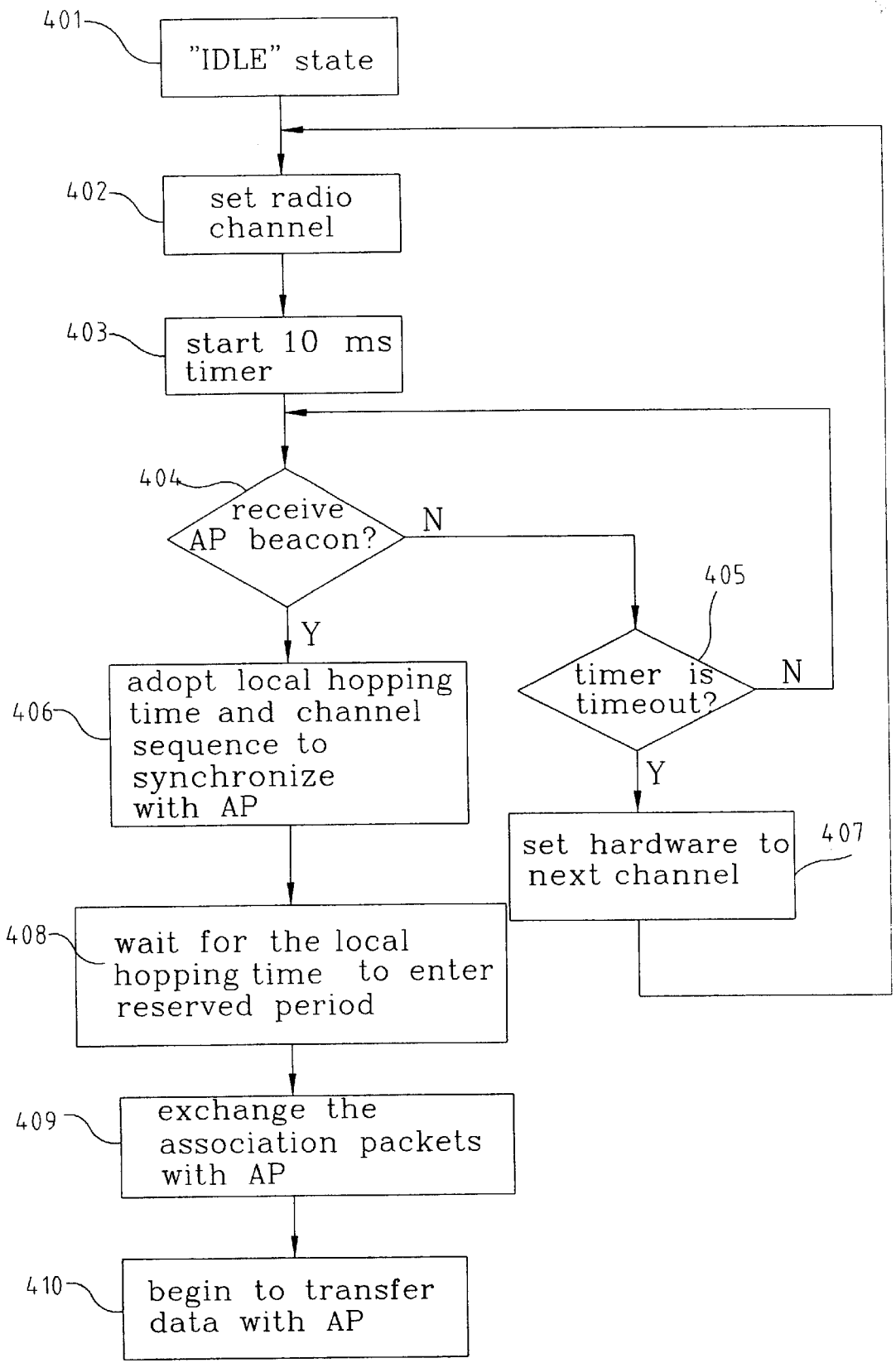
Figure 5:
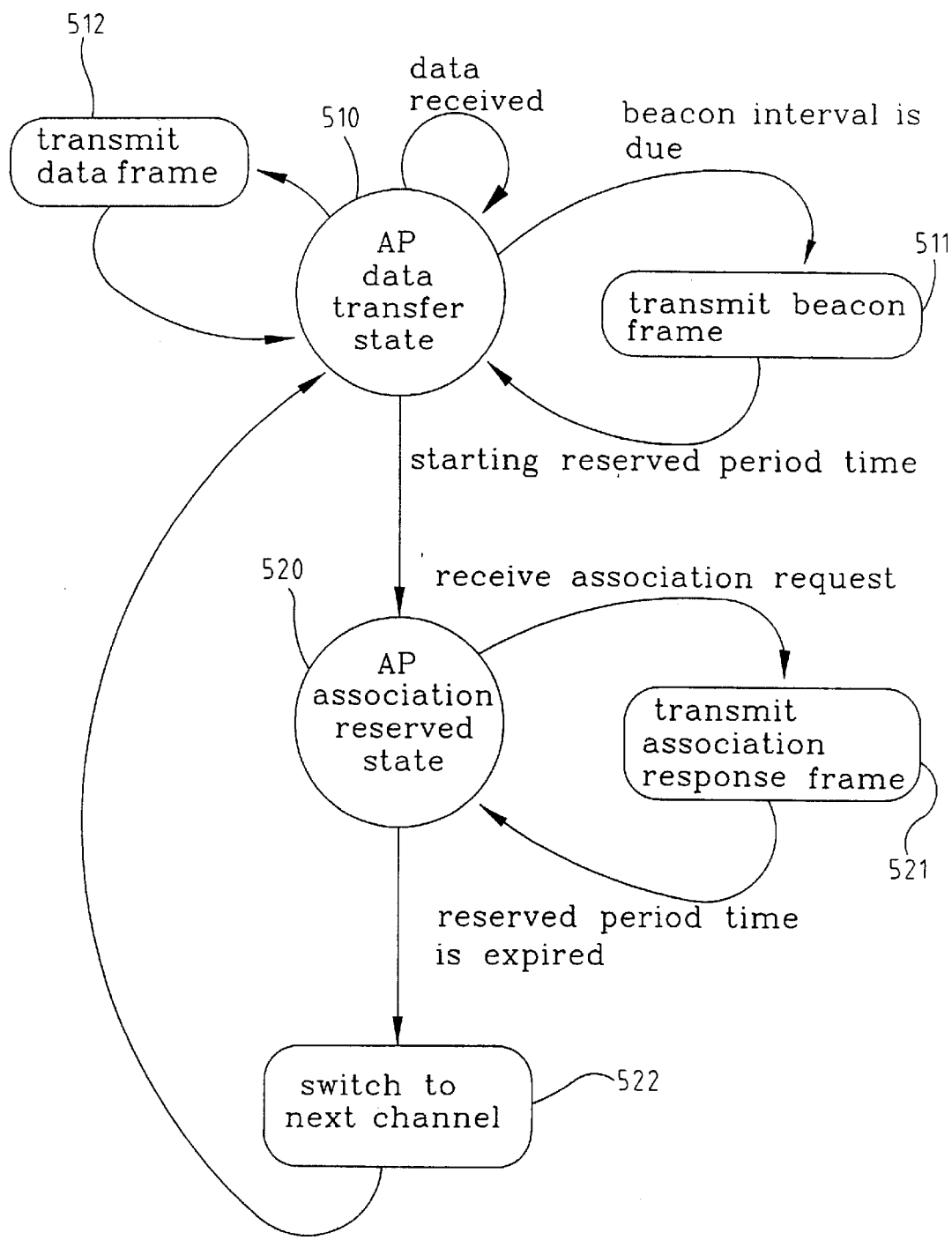
FIG. 5 shows a finite state machine for an AP in a channel, illustrating the current AP states existing for the flow in FIG. 4.

In the present invention, the primary point of novelty is the scheme that allows a wireless LAN station to finish all the processes from search to registration with an AP at a very high speed. FIG. 4 shows the flow chart for a wireless STA from search to registration with an AP according to the invention when a wireless LAN station is powered on. When a wireless LAN station performs all the steps from search to registration with the AP, the finite state machine for the AP employed therein is shown in FIG. 5.

With reference first to FIG. 4, a wireless STA initially starts at an "IDLE" state (step 401). The radio channel is set by the hardware (step 402). Because, the present invention shortens the time interval of beacon transmission to 10 mini seconds, it starts a 10 mini second timer (step 403). Then, the wireless STA listens in each channel and scans for any beacon frame transmitted by the AP.

At step 404, the wireless STA checks whether an AP beacon is received. Upon finding the channel and receiving the AP beacon, the scanning phase is completed.

Otherwise, the wireless STA checks whether the timer is timeout (step 405). If the timer is timeout, the wireless STA sets hardware to the next channel (step 407) and returns to step 402. If the timer is not timeout, at step 405, the wireless STA continues to check whether an AP beacon is received.

The wireless STA only needs to stay in a channel for 10 mini seconds to listen for the beacon frame on each hopping channel. For FCC regulation, this invention reduces the search time from 7900 (79*100) mini seconds to 790 (79*10) mini seconds.

After receiving the AP beacon, in order to maintain synchronization with the AP, at step 406, the receiving wireless STA sets local hopping time and channel sequence to be same as the information contained in the AP beacon.

In the steps as shown in FIG. 4, the invention does not perform authentication process. In stead, it reserves a period of time on each channel for sending the association control packets. Accordingly, at step 408, the wireless STA waits for the local hopping time to enter the reserved period.

In the association phase (step 409), the wireless STA exchanges the association packets with the AP to accomplish the AP registration. The communication connection between the wireless STA and the AP is thus setup. At step 410, the wireless STA starts the data transfer with the AP.

The state machine given by FIG. 5 comprises two states for an AP. One is a data transferring state 510 of the AP in the scanning phase of the wireless STA. The other is a reserved state 520 of the AP in the association phase of the wireless STA.

In state 510, the allowed transferring frames are either a data frame or a beacon frame as shown in steps 511 and 512. As mentioned before, the AP broadcasts a beacon frame at a fixed time interval on each channel. The AP schedules a beacon frame transmission including setting the beacon interval of beacon frame transmission as well as setting the exact time of transmitting a beacon frame as the next frame for transmission. After the AP completes the beacon frame transmission, it goes back to the data transferring state.

As shown in FIG. 5, in state 510, the AP can transfer data too. After the AP completes the data frame transmission, it goes back to the data transferring state. When data receiving is completed, the AP also goes back to the data transferring state.

As mentioned earlier, the present invention reserves a period of time on each channel for sending the association control packets. Once starting the reserved period time, the AP enters the reserved state 520 in the association phase of the wireless STA.

During the reserved period, only association request or response is allowed. Therefore, when the receiving wireless STA is just turned on and trying to associate with the AP, it can exchange the control frames with AP only using this reserved period.

As shown in state 520, when receiving association request is completed, the AP starts transmitting association response frame as shown in step 521. Upon completing the transmission, the AP goes back to the state 520. In addition, during the reserved period, the AP doesn't transfer data frame or data packet.

Once the reserved period expires, as shown in step 522, the AP switches to the next channel and continues to process operations of states 510 and 520.

Because the reserved period is dedicated to sending the association control packet, the receiving wireless STA can use this reserved period to exchange the control frames with AP. And, the receiving wireless STA doesn't need to compete with the other stations that are transferring data with AP. Therefore, it won't delay and the processing time from search to registration with an AP can also be guaranteed.

Figure 6B:
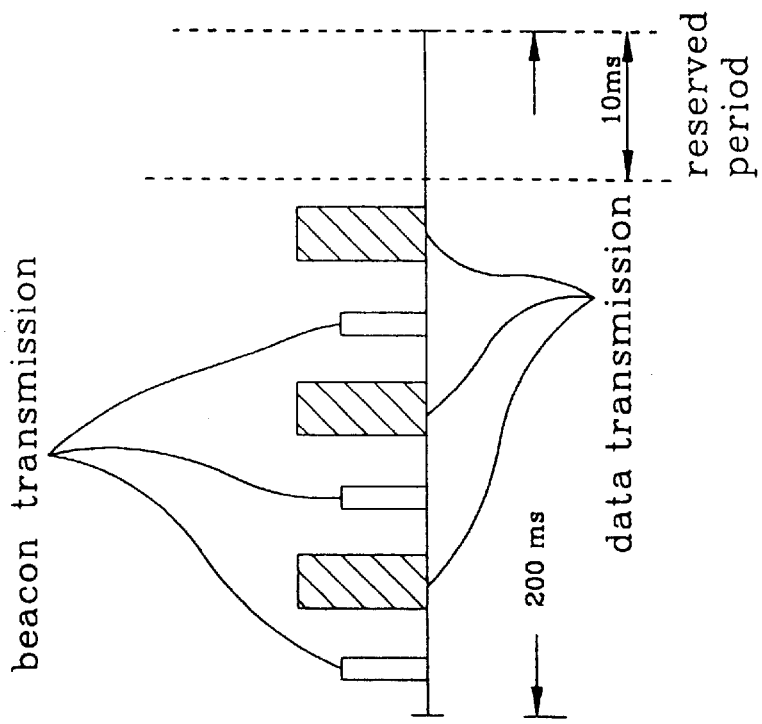
FIGS. 6a–6b illustrate the beacon interval for AP transmitting beacon and the reserved period on each channel according to the present invention respectively.
Figure 6A:
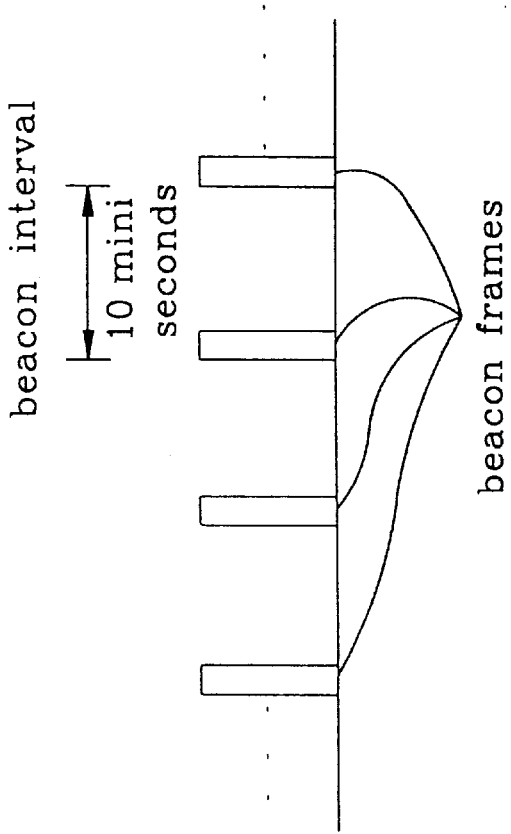

FIG. 6*a* illustrates the beacon interval for the AP to transmit beacon according to the present invention. Beacons are generated for transmission by the AP once every beacon interval. In the embodiment of the present invention, the beacon interval is 10 mini seconds.

FIG. 6*b* illustrates the reserved period on each channel according to the present invention. The reserved period is dedicated to sending only the association control packets. As shown in the FIG. 6*b*, neither the data frame nor the beacon frame can be sent in this period for AP and other associated stations.

There are several factors in selecting the range for the reserved period. One is the number of booting up stations to be supported for achieving the quick association. As is known, a wireless LAN station takes about 2 ms to finish the registration process with an AP after it finds the AP. In the case of five wireless stations in a wireless LAN, if they are booted up at the same time, according to the present invention, the time of reserved period should be set to the value that is longer than 2*5 ms in order to accomplish the registration for all stations.

Because the data packet transfer is inhibited during the reserved period, the throughput bandwidth of the wireless LAN system is scarified. For longer reserved period, the wireless LAN system scarifies more throughput bandwidth.

The present invention generally takes 5% scarified throughput bandwidth. In the sense that, if five wireless LAN stations are allowed to start up in the same time, the present invention specifies the reserved period to be 10 ms for each hopping channel having 200 ms of dwell time.

Although this invention has been described with a certain degree of particularity, it is to be understood that the present disclosure has been made by way of preferred embodiments only and that numerous changes in the detailed construction and combination as well as arrangement of parts may be restored to without departing from the spirit and scope of the invention as hereinafter set forth.

What is claimed is:

1. An access point state machine for establishing a connection link with wireless stations for a wireless local area network system having at least one basic service sets, each basic service set containing an access point and at least one wireless station, comprising:

data transfer state for transmitting beacon frames and accessing data frames by said access point, said access point scheduling a beacon frame as the next frame for transmission, transmitting a beacon frame at a fixed time interval on each hopping channel, and selecting a reserved period of time on each hopping channel for exchanging association control packets with said wireless stations; and association reserved state for exchanging said association control packets with said wireless stations and switching to next hopping channel for continuing said data transfer state and association reserved state, said association control packets including association requests received from said wireless stations and association response frames transmitted by said access point, said access point transmitting an association response frame after an association request is received;

wherein said access point enters said reserved association state from said data transfer state once said reserved period of time starts, and said access point switches to next hopping channel for continuing said data transfer state and association reserved state once said reserved period expires.

2. The access point state machine according to claim 1, wherein said access point refers to a plurality of parameters including the number of booting up wireless stations and the throughput bandwidth of the wireless LAN system for selecting the length of said reserved period of time.

* * * * *